US011146189B2

(12) United States Patent
Bitterolf et al.

(10) Patent No.: US 11,146,189 B2
(45) Date of Patent: Oct. 12, 2021

(54) OPTIMIZED OPERATION OF A MACHINE HAVING A PLURALITY OF DRIVES

(71) Applicant: Siemens Aktiengesellschaft, Munich (DE)

(72) Inventors: David Bitterolf, Erlangen (DE); Stefan Rupprecht, Postbauer-Heng (DE); Bernd Wedel, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/269,850

(22) PCT Filed: Aug. 20, 2019

(86) PCT No.: PCT/EP2019/072199
§ 371 (c)(1),
(2) Date: Feb. 19, 2021

(87) PCT Pub. No.: WO2020/038910
PCT Pub. Date: Feb. 27, 2020

(65) Prior Publication Data
US 2021/0194397 A1 Jun. 24, 2021

(30) Foreign Application Priority Data
Aug. 22, 2018 (EP) .................................. 18190184

(51) Int. Cl.
*H02P 5/74* (2006.01)
(52) U.S. Cl.
CPC ...................... *H02P 5/74* (2013.01)
(58) Field of Classification Search
CPC .......... H02P 5/74; G05B 13/021; G05B 15/02
(Continued)

(56) References Cited

U.S. PATENT DOCUMENTS 6,822,416 B1 * 11/2004 Kunz ................... H02H 7/0844
318/700
2012/0306413 A1 12/2012 Tezuka et al.

FOREIGN PATENT DOCUMENTS

DE 4330537 A1 3/1995

OTHER PUBLICATIONS

PCT International Preliminary Examination Report and Written Opinion of International Examination Authority dated Dec. 17, 2020 corresponding to PCT International Application No. PCT/EP2019/072199 filed Aug. 20, 2019.

* cited by examiner

*Primary Examiner* — David Luo
(74) *Attorney, Agent, or Firm* — Henry M. Feiereisen LLC (57) ABSTRACT

A control device for drives of a machine switches between normal operation and special operation depending on power demand from a power supply. In both operating modes, the control device cyclically determines preliminary current setpoint values. In normal operation, the current setpoint values match the preliminary setpoint values. In special operation, the control device dynamically determines a proportional factor for the drives depending on nominal and/or actual operating states of the drives. The control device determines current setpoint values by modifying the preliminary current setpoint values so that a respective drive draws no more power than the product of the respective proportional factor and the available total power. The current setpoint values and the current actual values are fed to drive controllers for the first drives, by means of which the preliminary first current setpoint values are determined. The control characteristics of the drive controllers include an integral part.

11 Claims, 7 Drawing Sheets

(58) Field of Classification Search
USPC .................................................. 318/490, 34
See application file for complete search history.

OPTIMIZED OPERATION OF A MACHINE HAVING A PLURALITY OF DRIVES

CROSS-REFERENCES TO RELATED APPLICATIONS

This application is the U.S. National Stage of International Application No. PCT/EP2019/072199, filed Aug. 20, 2019, which designated the United States and has been published as International Publication No, WO 2020/038910 A1 and which claims the priority of European Patent Application, Serial No. 18190184.4, filed Aug. 22, 2018, pursuant to 35 U.S.C. 119(a)-(d).

BACKGROUND OF THE INVENTION

The present invention is based on an operating method for a machine which has a plurality of first drives,
  wherein a control facility of the machine monitors a power demand which the machine draws via a feed facility supplying at least the first drives with electrical energy,
  wherein the control facility switches the machine over from a normal operation to a special operation as soon as the power demand exceeds an upper switch-over value and the machine switches over from special operation to normal operation as soon as the power demand falls below a lower switch-over value,
  wherein the control facility ascertains cyclically, both in normal operation and also in special operation for the first drives, using a first basic setpoint value of the respective first drive that is valid for the respective cycle, a respective preliminary first current setpoint value,
  wherein the control facility ascertains, both in normal operation and also in special operation, the preliminary first current setpoint values such that an operating state of the respective first drive approximates as far as possible to the respective first basic setpoint value,
  wherein the control facility controls the first drives both in normal operation and also in special operation according to a respective resultant first current setpoint value,
  wherein in normal operation, the resultant first current setpoint values match the respective preliminary first current setpoint values,
  wherein, in special operation, the control facility ascertains a total power available for the first drives altogether.

The present invention is further based on a control program for a control facility for a machine that has a plurality of first drives, wherein the control program has machine code that is configured to be executed by the control facility, wherein the execution of the machine code by the control facility causes the control facility to operate the machine according to an operating method of this type.

The present invention is further based on a control facility for a machine that has a plurality of first drives, wherein the control facility is programmed with a control program of this type so that the control facility operates the machine according to an operating method of this type.

The present invention is further based on a machine,
  wherein the machine has a plurality of first drives,
  wherein the machine has a feed facility by means of which at least the first drives are supplied with electrical energy,
  wherein the machine has a control facility of this type which controls the first drives.

Machines often have a plurality of electrical drives which are supplied with electrical energy via a common feed facility, for example, a rectifier with a downstream voltage link. The feed facility must be dimensioned and operated such that its momentary maximum power—i.e. the power that the feed facility can make available to the drives—is always greater than the sum of the powers that the drives currently actually draw via the feed facility.

The power demanded in total by the drives often varies to a considerable extent during the operation of the machine. For example, in a machine tool, in particular, before and after a tool change, the power demanded is very large since, in this case, all the position-controlled axes accelerate or brake simultaneously and furthermore, often also ramp rotary speed-controlled spindles up or down. During the remaining processing time, the power demanded in total is often much lower.

The feed facility must be capable of supplying the electrical energy required to all the drives at any time. If the feed facility cannot provide the required power even only briefly, then a low voltage arises in the voltage link. As a consequence of this voltage dip, the entire machine comes to a standstill. The voltage of the voltage link must be ramped up again. Only thereafter can the operation of the machine be continued.

In order to prevent this fault, various solutions are known in the prior art.

In the first place, it is known to dimension the feed facility correspondingly large. This solution is associated with correspondingly high costs, both for the acquisition of the machine and its components as such, as well as for the operation. Secondly, the feed facility is also correspondingly voluminous.

In the event of such dimensioning, during a majority of the operating time of the machine, only a fraction of the possible power is fed to the drives by the feed facility. The power reserves of the feed facility remain unused most of the time.

For this reason, it is additionally known to dimension the feed facility smaller, but also to monitor the power consumption of the drives. In particular, it is possible in some drives to tolerate a certain control deviation. In the wording of the present invention, these are the first drives. In the case of other drives, the toleration of a control deviation is not possible. In the wording of the present invention, these are the second drives.

In the case of speed-controlled drives, in particular, it is often possible to tolerate a system deviation. But also in the case of position-controlled drives, at least in some cases, a system deviation can be tolerated. If, in such a case, the power requirements of the drives in total exceed the capacity of the feed facility, only the drives in which a system deviation cannot be tolerated are operated normally. In the other drives, that is, those drives in which a certain system deviation is tolerable, a fixed percentage of the residual power which the feed facility can make available to these drives in total is assigned to the drives. If, therefore—for example—the feed facility can make a maximum of 100 kW available and the drives in which a system deviation is not tolerable need 70 kW, the residual power amounts to 30 kW. This 30 kW is assigned, according to firmly assigned percentage rates—for example, in equal parts—to those drives in which the system deviation is tolerable. If, for example, three such drives are available, 10 kW is assigned to each such drive.

In the prior art, these drives are therefore statically assigned a certain percentage proportion of the total power available for these drives. The assigned power can vary with the available total power. The (relative) proportion as such, that is, the ratio of the available total power respectively assigned to such a drive, however, remains always constant.

With the prior art procedure, it can occur that that available total power is ineffciently distributed. In particular, it can occur that one or more of these drives does or do not exhaust the power assigned to the respective drive. Staying with the example above with 30 kW which is evenly distributed over three drives: it can occur, for example, that of these three drives, one draws 6 kW, another 8 kW and the third 20 kW, thus altogether 34 kW. With an even distribution of the total available 30 kW over the three drives, the three drives would receive 6 kW, 8 kW and 10 kW, thus altogether 24 kW. The feed facility could therefore supply a further 6 kW of power. Nevertheless, the power assigned to the third of these three drives is not limited to 16 kW, but to 10 kW.

From DE 43 30 537 A1, there is known a system in which a converter is connected via a rectifier unit to an alternating current network, wherein the rectifier unit feeds a link circuit to which a plurality of inverters are connected. At all times, the current power and the maximum possible power are ascertained and therefrom, the loading of the rectifier unit is ascertained. If the loading is too high, the power levels drawn by the drives are reduced. Thereby, in relation to all the drives, an even reduction of the power drawn or, in relation only to particular drives, a reduction of the power drawn can take place, as needed. Furthermore, a coordination by a higher-level control facility can take place. It is possible that the drives ascertain their power requirement prospectively on the basis of operating setpoint values and communicate them to the higher-level control facility. This takes account of the values transferred in the context of the ascertainment of the expected loading of the rectifier unit.

It is an object of the present invention to provide possibilities by means of which a better utilization of the power that can be made available by the feed facility is brought about.

SUMMARY OF THE INVENTION

The object is achieved with an operating method as set forth hereinafter. Advantageous embodiments of the operating method are the subject matter of dependent claims.

According to the invention, an operating method of the aforementioned type is configured in that, in special operation, the control facility
  while evaluating current setpoint and/or actual operating states of the first drives for the first drives, dynamically ascertains a respective proportional factor and
  ascertains the resulting first current setpoint values by modification of the preliminary first current setpoint values such that only a respective power is drawn by the respective first drive which results as the product of the respective proportional factor and the available total power.

Furthermore, the control facility implements, for each of the first drives, a drive controller to which the respective first basic setpoint value and a respective corresponding first basic actual value are fed and by means of which the control facility ascertains the respective preliminary first current setpoint value. The drive controllers have a control characteristic with an integral-action component. It can be implemented, in particular, as a PI controller. The preliminary first current setpoint values are used in the ascertainment of the proportional factors.

The respective proportional factor is therefore not determined once statically in advance, but rather dynamically on the basis of the respective operating state of the machine. By this means, in particular in some operating states of the machine, a reduction of the powers supplied to the first drives can be prevented entirely and in other cases at least an optimized operation can take place. On the basis of the ascertainment of the proportional factors while taking account of the preliminary first current setpoint values, wherein these are ascertained while utilizing an integral-action component of the higher-level controller, it can be achieved that a particular first drive for which initially only a small proportional factor is ascertained, gradually increases its proportional factor and thereby later makes up a "backlog" which it initially acquires relative to other first drives.

The sum of the proportional factors preferably always amounts to the value 1. In this way, the available total power that can be made available in total by the feed facility in total to the first drives is fully utilized.

It is possible that all the drives of the machine are first drives within the meaning of the present invention. Alternatively, it is possible that the machine additionally has a number of second drives which are also supplied with electrical energy via the feed facility, but in which the power levels drawn by the second drives cannot be reduced. In this case, the operating method according to the invention is configured such that
  the control facility ascertains cyclically for the second drives, both in normal operation and also in special operation, a second current setpoint value, using a second basic setpoint value of the respective second drive that is valid for the respective cycle, and controls the respective second drive according to the respective second current setpoint value, and
  that the control facility ascertains the second current setpoint values both in normal operation and also in special operation, such that an operating state of the respective second drive approximates as far as possible to the respective second basic setpoint value.

In addition, in this case, the control facility ascertains the total power available for the first drives in total on the basis of a power limit value of the feed facility and a second power level which is currently drawn by the second drives via the feed facility. If required, in this case, the control facility can also ascertain the upper and lower switch-over value dependent upon these variables. Thereby, the operating method according to the invention can also be used if the machine has both first and also second drives.

It is further possible that the rating of a particular drive as a first or a second drive is static. However, it can also be dynamic. Such drives are therefore designated third drives in the context of the present invention. The control facility treats each of these drives as a first drive or a second drive as needed, dependent upon the operating state of the machine. This results in greater flexibility in the operation of the machine.

Different possibilities exist for the ascertainment of the proportional factors.

For example, it is possible that the control facility ascertains the proportional factors in such a way that the respective proportional factor for each first drive is equal to the ratio of a setpoint moment to be applied by the respective first drive to the total of the setpoint moments to be applied by the first drives in total. This procedure has the advantage, in particular, that it always provides useful proportional factors.

Alternatively, it is possible that the control facility ascertains the proportional factors in such a way that the respective proportional factor for each first drive is equal to the ratio of a product determined for the respective first drive to the sum of products determined for the first drives in total and that the respective product is determined by a setpoint moment to be applied by the respective first drive and a rotary speed of the respective first drive. This procedure has the advantage, in particular, that the proportional factors ascertained for the individual first drives reflect the power requirements of the individual first drives. The rotary speed of the respective first drive can be, if required, the setpoint rotary speed or the actual rotary speed of the respective first drive.

In the event of the ascertainment on the basis of the products, it can occur that a proportional factor assumes the value 0. This can occur, in particular, if the rotary speed of the respective first drive is 0. In this case, even with a rising setpoint moment, the proportional factor cannot become larger. In order to avoid this case, two different procedures are possible.

Firstly, it is possible that if the respective rotary speed of a first drive is below a respective minimum rotary speed above 0, for ascertaining the respective product, the control facility always replaces the respective rotary speed with the respective minimum rotary speed. Secondly, it is possible that if the respective product ascertained for a respective first drive is below a respective minimum product value above 0, in the context of the ascertaining of the proportional factor, the control facility always replaces the respective product with the respective minimum product value. The two procedures can also be combined with one another.

The object is further achieved with a control program of the type mentioned in the introduction which is configured such that the execution of the machine code by the control facility causes the control facility to operate the machine in accordance with an operating method according to the invention.

The object is further achieved by means of a control facility of the type mentioned in the introduction which is programmed with a control program according to the invention, so that the control facility operates the machine in accordance with an operating method according to the invention.

The object is further achieved by a machine of the type mentioned in the introduction, with the control facility being configured according to the invention.

BRIEF DESCRIPTION OF THE DRAWING

The above-described properties, features and advantages of this invention and the manner in which they are achieved are made more clearly and distinctly intelligible with the following description of the exemplary embodiments which are described in greater detail making reference to the drawings. In the drawings, in schematic representation.

DETAILED DESCRIPTION OF PREFERRED EMBODIMENTS

Figure 1:
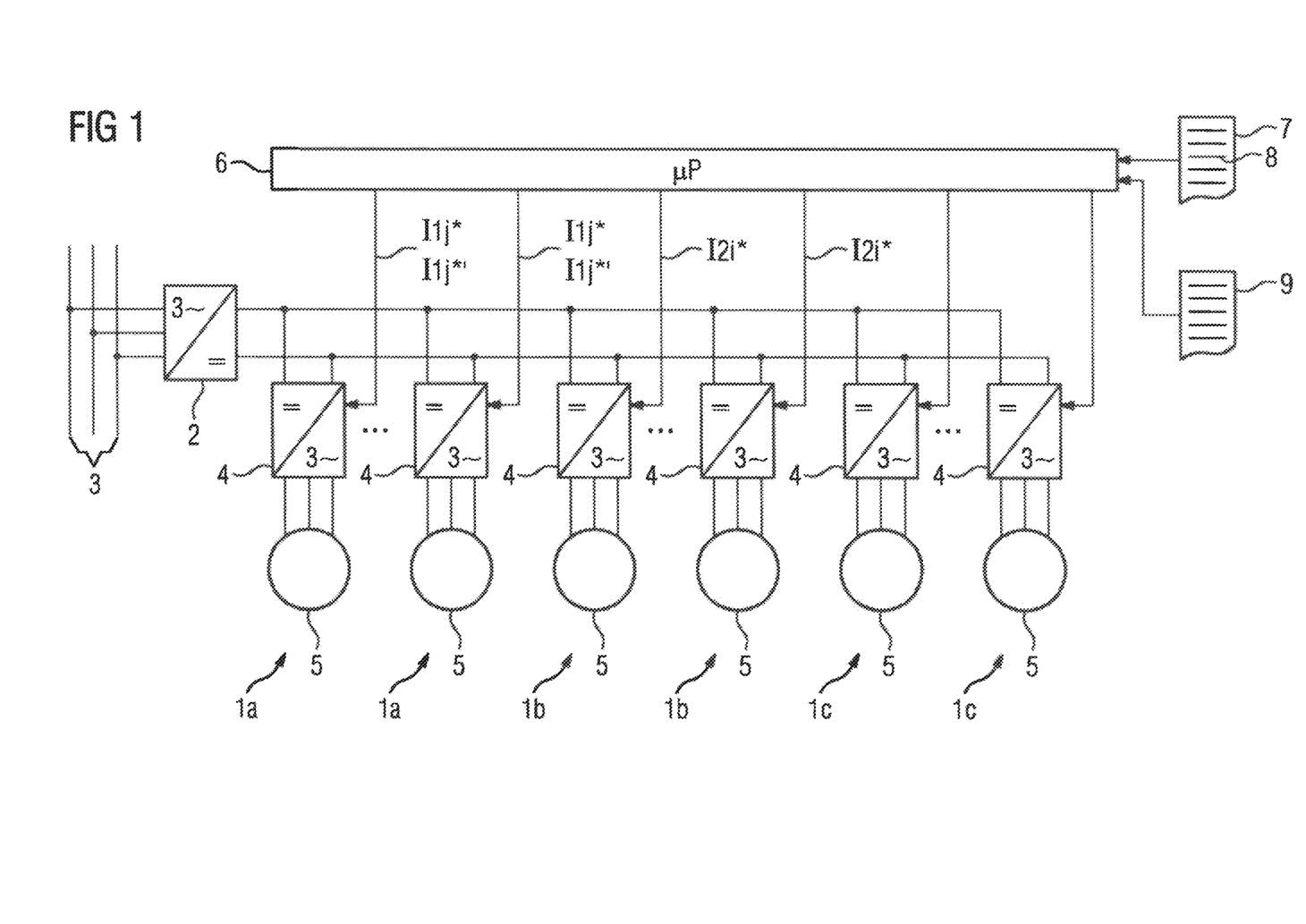
FIG. 1 shows a block circuit diagram of a machine.

According to FIG. 1, a machine has at least a plurality of first drives 1a. In addition, in many cases, second drives 1b are also present and in some cases—alternatively or In addition to the second drives 1b-third drives 1c also. The first, second and third drives 1a, 1b, 1c cooperate in the context of a control task. The control task can, in principle, be of any type. For example, the first, second and third drives 1a, 1b, 1 c can be components of a machine tool.

With regard to the configuration and the operating modes of the drives 1a, 1b, 1 that are possible in principle, it is possible that no differences exist between the different drives 1a, 1b, 1c. The differentiation between the drives 1a, 1b, 1c is therefore made since in the context of the technological object that is to be achieved with the machine, the first, second and third drives 1a, 1b, 1c can or must be driven in different ways. This will become clearer from the statements below.

The machine further has a feed facility 2. The feed facility 2 can be configured, for example, according to the representation in FIG. 1, as a rectifier which is fed from a (usually three-phase) supply network 3 and supplies a direct voltage U to converters 4 of the drives 1a, 1b, 1c. Alternatively, the feed facility 2 can be configured as an energy recovery-capable converter. The converters 4 convert the DC voltage U into the voltages and currents of a (usually three-phase) polyphase system, by means of which the electric machines 5 of the drives 1a, 1b, 1c are fed. Via the feed facility 2, the drives 1a, 1b, 1c are therefore fed with electrical energy.

The machine further has a control facility 6 which controls the first drives 1a and—where present—also the second drives 1b and the third drives 1c. The control facility 6 is usually software programmable, as indicated by the abbreviation "μP". The control facility 6 is therefore programmed with a control program 7. The control program 7 comprises machine code 8 which can be executed by the control facility 6. The programming of the control facility 6 with the control program 7 or, more specifically, the execution of the machine code 8 by the control facility 6 causes the control facility 6 to operate the machine according to an operating method which is described in greater detail below making reference to FIG. 2 and later also to the further drawings.

Figure 2:
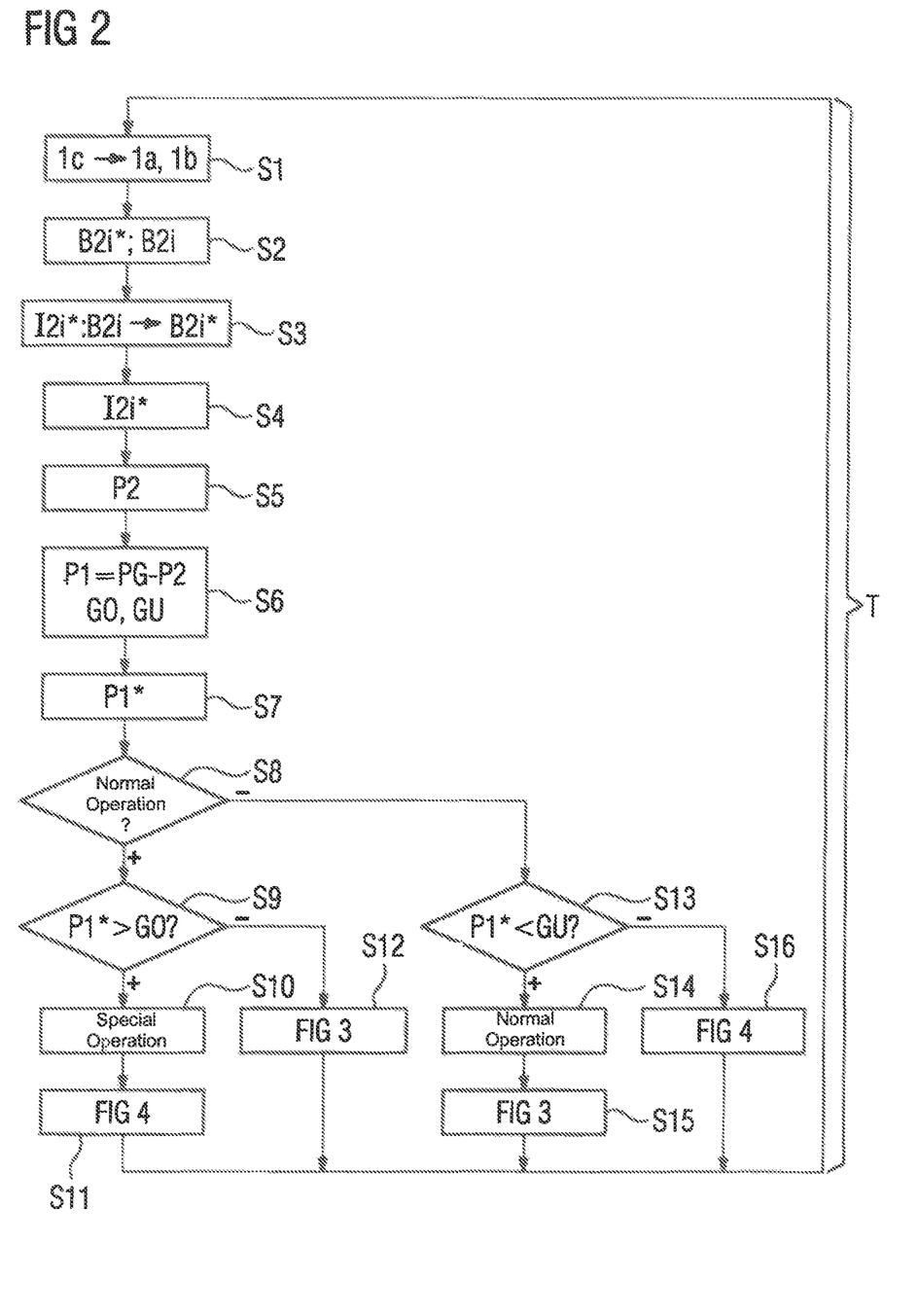
FIGS. 2 to 4 show flow diagrams.

According to FIG. 2, firstly in step S1, for each third drive 1c, the control facility 6 determines whether the respective third drive 1c is treated in the context of the subsequent steps S2 to S16 like a first drive 1a or like a second drive 1b. The determination can take place individually for each individual third drive 1c. Regardless of whether it takes place for each individual third drive 1c separately or whether the third drives 1c are handled in a group as first or second drives 1a, 1b or whether all the third drives 1c are handled equally either as first or as second drives 1a, 1b, the determination of step S1 takes place dependent upon the operating state of the machine.

An example of this: it is assumed that the machine is a machine tool. The machine tool has a plurality of speed-controlled spindles by means of each of which a workpiece is machined or rotated. In this event, the drives for the spindles are first drives 1a within the meaning of the present invention. It is further assumed that, at a determined time point in the processing, one of the tools is moved relative to the workpiece by means of three further drives of one of the tools and at this time point is in engagement with the workpiece. These drives must then be regarded at this time point as second drives 1b. It is further assumed that, by means of three further drives, another of the tools is moved in a position-controlled manner relative to the workpiece and at this time point is not in engagement with the workpiece. For example, a tool change can take place immediately. These drives can then be regarded at this time point either as second drives 1b or as first drives 1a. At another time point, another situation can naturally arise. For example, at this other time point, both tools can be in engagement with the workpiece. The drives of both tools must then be treated as second drives $1b$. At yet another other time point, for example, both tools cannot be in engagement with the workpiece. Then the drives of both tools can alternatively be regarded as first drives $1a$ or as second drives $1b$. If at least one of the drives, by means of which the tools are moved in a position-controlled manner, is treated, dependent upon the operating state, as a first drive $1a$ or as a second drive $1b$, this drive is a third drive within the meaning of the present invention. If it is always treated as a second drive $1b$, then it is a second drive $1b$.

Other machines and other situations are naturally also conceivable in which third drives $1c$, dependent upon the operating state of the machine, can be treated as first drives $1a$ or as second drives $1b$. If no third drives $1c$ are available, step S1 can be removed without replacement.

In the following, only the first drives $1a$ and the second drives $1b$ will still be considered, but not the third drives $1c$. The reason for this is that each third drive $1c$ cannot be considered as static, but as a first or second drive $1a$, $1b$ at the respective current time point.

In step S2, basic setpoint values $B2i^*$ (where $i=1, 2, \ldots$, number of second drives $1b$) become known to the control facility 6 for the second drives $1b$. The basic setpoint values $B2i^*$ can be, for example, position setpoint values or rotary speed setpoint values. They can be determined, for example, by a utility program 9. In the case of a machine tool, the utility program 9 would be, for example, a parts program. In addition, in many cases, in step S2, corresponding basic actual values $B2i$ are also known to the control facility 6. In step S3, the control facility 6 then ascertains—using the basic setpoint values $B2i^*$ and also, where present, the basic actual values $B2i$—a respective current setpoint value $I2i^*$ for the second drives $1b$. The control facility 6 ascertains the respective current setpoint value $I2i^*$ such that an operating state of the respective second drive $1b$ approximates as far as possible to the respective second basic setpoint value $B2^*$. The corresponding ascertainment is commonly known to persons skilled in the art and therefore need not be described in detail.

In step S4, the control facility 6 then actuates the second drives $1b$ according to the respectively ascertained current setpoint value $I2i^*$. The control is also commonly known to persons skilled in the art and therefore need not be described in detail.

In step S5, the control facility 6 ascertains a second power P2. The second power P2 is that power which must be fed to the second drives $1b$ in their totality so that the second drives $1b$ carry out the operational method defined by steps S2 and S3. For example, the control facility 6 can ascertain the respective rotary speed (setpoint or actual value) for each second drive $1b$ and multiply the rotary speed by the moment applied by the respective second drive $1b$. This product directly corresponds—except for a uniform constant adaptation factor all second drives $1b$—to the power drawn by the respective second drive $1b$. The moment can be readily ascertained from the current (setpoint or actual value).

In step S6, the control facility 6 then ascertains a total power P1 available for the first drives $1a$ altogether.

On the basis of the circumstance that in the present case, the presence of the second drives $1b$ is assumed, the control facility 6 firstly ascertains in step S6 at least one power limit value PG of the feed facility 2 and subtracts the second power P2 from the power limit value PG. The power limit value PG can be fixedly defined for the control facility 6 or can be ascertained by the control facility 6, for example, on the basis of operating parameters of the feed facility 2. The difference is given by the available total power P1 for the first drives $1a$.

If the second drives $1b$ are not available, steps S2 to S5 can be omitted without replacement. In this event, the available total power P1 can still be, for example, equal to the power that can be made available by the feed facility 2 in total, that is, equal to the power limit value PG.

Furthermore, in step S6 the control facility 6 ascertains an upper switch-over value GO and a lower switch-over value GU. The upper switch-over value GO is smaller than the available total power P1, and in general, slightly smaller. It is achieved thereby that the control facility 6 transfers in a timely manner, before the achievement of the available total power P1, to the special operation. The lower switch-over value GU can be equal to the upper switch-over value GO. The lower switch-over value GU is at least no larger than the upper switch-over value GO. Preferably, the lower switch-over value GU is smaller than the upper switch-over value GO. In this way, a switching hysteresis during switch-over between normal operation and special operation is achieved, so that the operational method of the machine is stabler overall.

In step S7, the control facility 6 then ascertains, for the first drives $1a$, a power demand $P1^*$ of the first drives $1a$. The power demand $P1^*$ is the amount that is demanded by the first drives $1a$ in total. It is found from the sum of the powers drawn by the first drives $1a$ individually. The powers demanded can be determined, for example—as described above for the second drives $1b$—by the product of the setpoint moment and the rotary speed (setpoint or actual value).

In step S8, the control facility 6 tests whether it is in a normal operation. If this is the case, it further tests in step S9 whether the power demand $P1°$ exceeds the upper switch-over value GO. If this is the case, the control facility 6 assumes a special operation in step S10 and then in step S11, executes the part of the operating method according to the invention which it executes only in the special operation. Otherwise, in step S12, the control facility 6 executes the part of the operating method according to the invention that it executes in normal operation.

If the control facility has established in step S8 that it is in special operation, it transfers to step S13. In step S13, the control facility 6 tests whether the power demand $P1^*$ falls below the lower switch-over value GU. If this is the case, the control facility 6 assumes normal operation in step S14 and then, in step S15, executes the part of the operating method according to the invention which it only executes in normal operation. Otherwise, in step S16, the control facility 6 executes the part of the operating method according to the invention that it executes only in special operation.

In the above, the respectively available total power P1 was ascertained in that the second power P2 of the second drives $1b$ was subtracted from the power limit value PG. It is naturally also possible and entirely equivalent to form the sum of the second power P2 (or the associated setpoint value) and of the power demand $P1^*$ and to compare this sum with the upper switch-over value GO and the lower switch-over value GU. The upper switch-over value GO and the lower switch-over value GU must naturally be adapted accordingly in this case.

Figure 3:
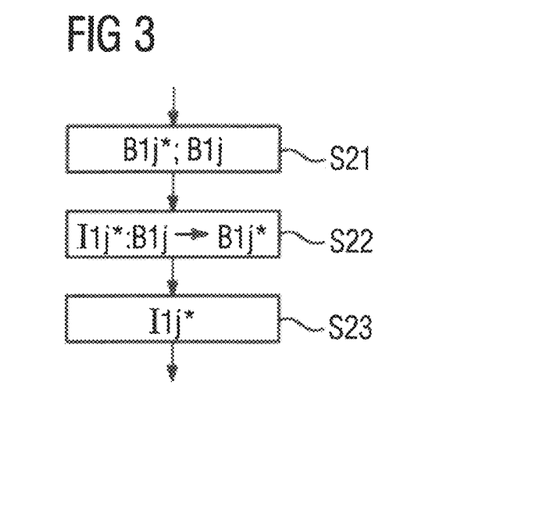

The following describes, making reference to FIG. 3, that part of the operating method according to the invention which the control facility 6 executes only in normal operation. FIG. 3 therefore shows a possible implementation of steps S12 and S15.

According to FIG. 3, in step S21, basic setpoint values $B1j^*$ (where j=1, 2, ..., number of first drives $1a$) become known to the control facility 6 for the first drives $1a$. The basic setpoint values $B1j^*$ can be, for example, position setpoint values or moment setpoint values. Usually, they are rotary speed setpoint values. They can also be determined, for example, by the utility program 9. In addition, in many cases, in step S21, corresponding basic actual values $B1j$ are also known to the control facility 6. The control facility 6 then ascertains, in step S22—using the basic setpoint values $B1j^*$ and also, where present, the basic actual values $B1j$—a respective current setpoint value $I1j^*$ for each of the first drives $1a$. The control facility 6 ascertains the respective current setpoint value $I1j^*$ such that an operating state of the respective first drive $1a$ approximates as far as possible to the respective first basic setpoint value $B1j^*$. The corresponding ascertainment is commonly known to persons skilled in the art and therefore need not be described in detail. In step S23, the control facility 6 then actuates the first drives $1a$ according to the respectively ascertained current setpoint values $I1j^*$. The actuation is also commonly known to persons skilled in the art and therefore need not be described in detail.

Steps S21 to S23 correspond in their content to steps S2 to S4. However, in contrast to steps S2 to S4, they are not carried out for the second drives $1b$, but for the first drives $1a$.

In the following, making reference to FIG. 4, that part of the operating method according to the invention which the control facility 6 executes only in special operation is described. Thus, FIG. 4 shows a possible implementation of steps S11 and S16.

Figure 4:
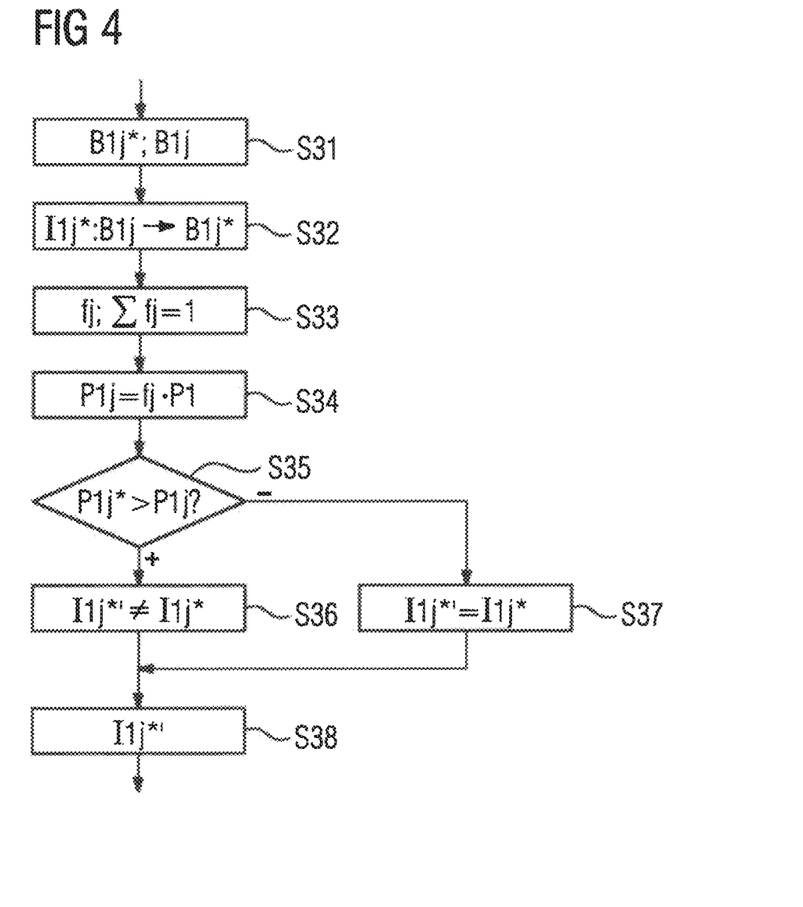

According to FIG. 4, in special operation, firstly steps S31 and S32 are carried out. Steps S31 to S32 correspond 1:1 to steps S21 and S22 of FIG. 3.

In step S33, the control facility 6 ascertains a proportional factor fj for each of the first drives $1a$ (where j=1, 2, ..., number of first drives $1a$). The control facility 6 preferably always ascertains the proportional factors fj such that the sum of the proportional factors fj attains the value 1. Preferable ascertaining methods for the proportional factors fj are described in greater detail below. However, regardless of the concrete method of ascertaining, the control facility 6 ascertains the proportional factors fj while evaluating current setpoint and/or actual operating states of the first drives $1a$. In addition, the control facility 6 ascertains the proportional factors fj dynamically.

In step S34, the control facility 6 then determines, for the first drives $1a$, a respective maximum power $P1j$. The maximum power $P1j$ for each first drive $1a$ is formed as the product of the respective proportional factor fj and the total power P1 available for the first drives $1a$.

In step S35, the control facility 6 tests, for each first drive $1a$ individually, whether its expected power demand $P1j^*$—defined, for example, by the rotary speed (setpoint or actual value) and the current setpoint value $I1j^*$ of the respective first drive $1a$—exceeds the maximum power $P1j$ ascertained for the respective first drive $1a$. If this is the case, the control facility 6 ascertains, in step S36, a resultant current setpoint value $I1j^{*'}$ for this first drive $1a$ by modifying the current setpoint value $I1j^*$ ascertained in step S32. The modification takes place such that only a power that is equal to the maximum power $P1j$ ascertained for this first drive $1a$ is drawn by the respective first drive $1a$. Otherwise, in one step S37, the control facility 6 adopts the previously ascertained current setpoint value $I1j^*$ as the resultant current setpoint value $I1j^{*'}$.

In step S38, the control facility 6 then actuates the first drives $1a$ according to the respectively ascertained current setpoint values $I1j^*$. Step S38 therefore corresponds to step S23 of FIG. 3.

The current setpoint values $I1j^*$ ascertained in step S32 are thus only preliminary current setpoint values $I1j^*$ which are either—if step S37 is carried out for the respective first drive $1a$—equal to the current setpoint value $I1j^{*'}$ for this first drive $1a$, or—if step S36 is executed for the respective first drive $1a$-modified in step S36.

As previously mentioned, steps S21 to S38 of FIGS. 3 and 4 represent implementations of steps S11, S12, S15 and S16. They are also incorporated into the embodiment of steps S1 to S16 of FIG. 2. The execution of steps S1 to S16 of FIG. 2 however clearly takes place cyclically. Due to this circumstance, both the basic setpoint values $B1j^*$, $B2i^*$ as well as the basic actual values $B1j$, $B2i$ and also the current setpoint values $I1j^*$, $I2j^*$ and the proportional factors fj and also the other ascertained values P1, P2, P1*, etc. are always valid for the respective cycle. A cycle time T is usually in the single-figure millisecond range and sometimes slightly below this.

Figure 5:
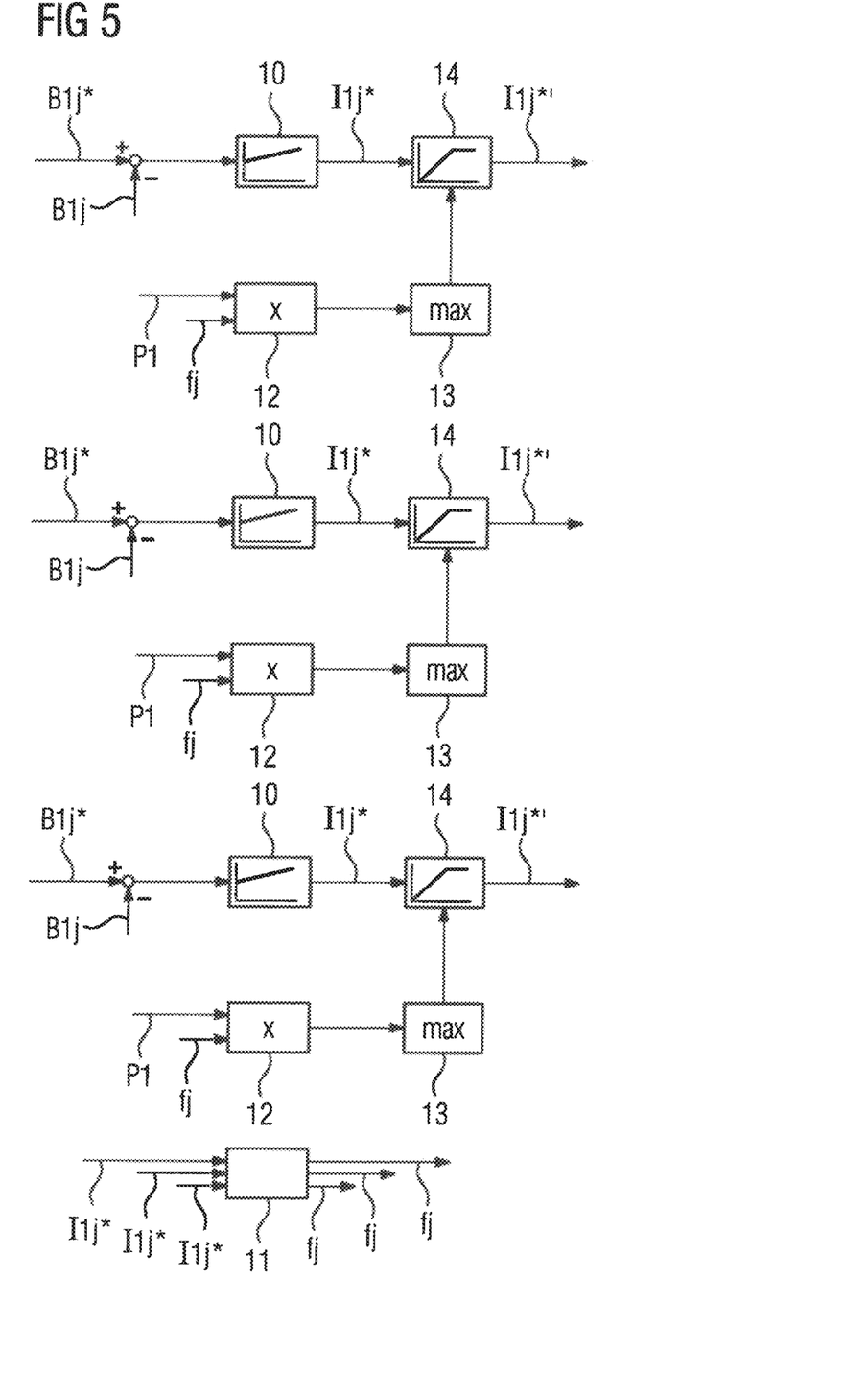
FIG. 5 shows a control circuit for a first drive.

FIG. 5 shows an embodiment of a control circuit for a first drive $1a$. The control circuit for the second drives $1b$ and possibly also the third drives $1c$ can be configured in a similar way. This is, however, of secondary significance in the context of the present invention.

According to FIG. 5, the control facility 6 implements a drive controller 10 for each of the first drives $1a$. This is shown in FIG. 5—purely by way of example—for three first drives $1a$. The respective basic setpoint value $B1j^*$ and the respective corresponding basic actual value $B1j$ are fed to each drive controller 10. By means of the respective drive controller 10, the control facility 6 ascertains the respective preliminary current setpoint value $I1j^*$. Each drive controller 10 has a control characteristic with an integral-action component. In particular, it can be realized according to the representation in FIG. 5 as a PI-controller.

Furthermore, the control facility 6 implements an ascertaining block 11. The preliminary current setpoint values $I1j^*$ ascertained by means of the drive controller 10 are fed to the ascertaining block 11. The proportional factors fj are ascertained in the ascertaining block 11. The ascertainment in the ascertaining block 11 takes place while taking account of the preliminary current setpoint values $I1j^*$ fed to the ascertaining block 11.

If required, further variables can be fed to the ascertaining block 11, for example, the setpoint rotary speeds or the actual rotary speeds of the first drives $1a$. This is, however, not shown in FIG. 5.

The ascertained proportional factors fj are then fed to multipliers 12 in which they are multiplied by the available total power P1. The respective result is fed to a respective ascertaining block 13 which ascertains—for example, with additional utilization of a rotary speed of the respective first drive $1a$—an associated maximum value for the respective current setpoint value $I1j^*$. The respective maximum value is fed to a respective limiter 14 which limits the respective current setpoint value $I1j^*$ accordingly, if this is required. Thereby, if required, the respective preliminary current setpoint value $I1j^*$ is modified to the respective resulting current setpoint value $I1j^*$.

Possible specific procedures for ascertaining the proportional factors fj will now be described in greater detail, making reference to FIGS. 6 to 9. FIGS. 6 to 9 each show a possible implementation of step S33 of FIG. 4.

Figure 6:
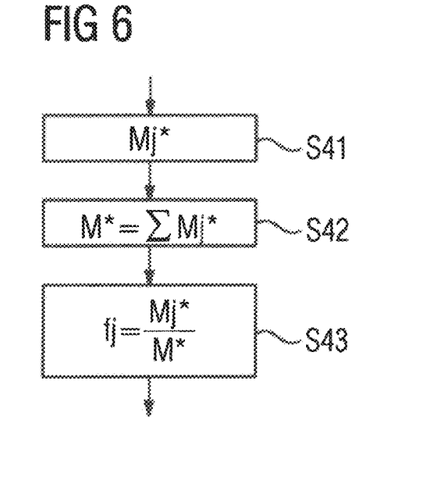
FIGS. 6 to 9 show flow diagrams.

It is thus possible, for example, according to the representation in FIG. 6, that the control facility 6 ascertains a setpoint moment Mj* in step S41 for each of the first drives 1a. In particular, the control facility 6 can ascertain the respective setpoint moment Mj*, in particular, on the basis of the respective preliminary current setpoint value I1j*. In step S42, the control facility 6 then ascertains a total moment M* by forming the sum of the setpoint moments Mj*. Finally, in step S43, the control facility 6 divides the respective setpoint moment Mj* by the total moment M* and thereby ascertains the respective proportional factor fj.

Figure 7:
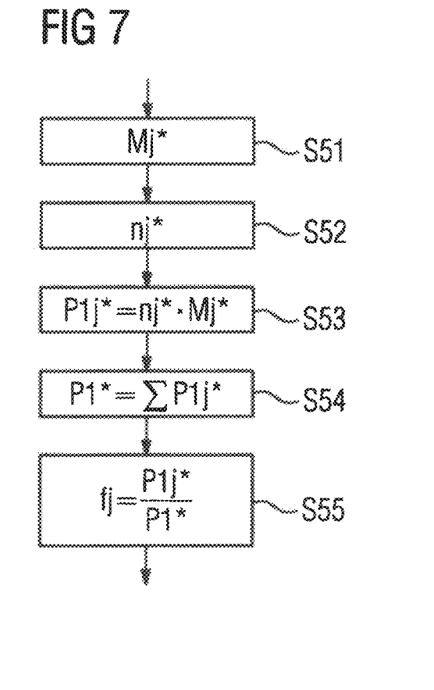

Alternatively, it is possible, for example, according to the representation in FIG. 7, that, in step S51, the control facility 6 ascertains a setpoint moment Mj* for each of the first drives 1a. Step S51 corresponds in its content with step S41 of FIG. 6. Then in step S52, the control facility 6 ascertains a setpoint rotary speed nj* for each of the first drives 1a. In step S53, the control facility 6 then ascertains a respective setpoint power P1j* by forming the product of the respective setpoint moment Mj* and the respective setpoint rotary speed nj*. In step S54, the control facility 6 then ascertains an expected total power by forming the sum of the setpoint powers P1j*. The expected total power matches the expected power demand P1*. Finally, in step S55, the control facility 6 divides the respective setpoint power P1j* by the expected total power and thereby ascertains the respective proportional factor fj.

Figure 8:
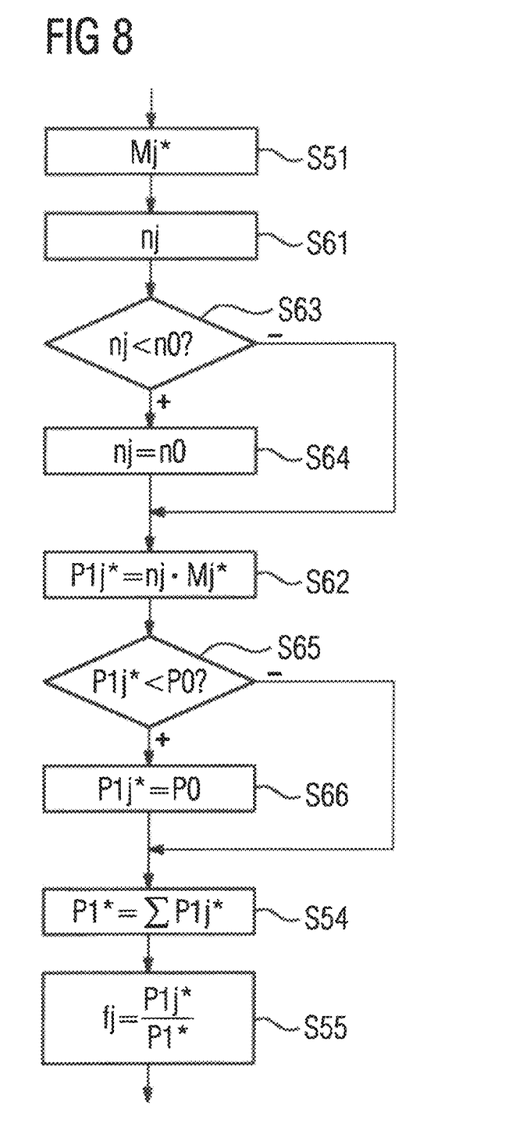

The procedure of FIG. 8 corresponds in large part to that of FIG. 7. However, steps S52 to S53 are replaced with steps S61 and S62. In step S61, the control facility 6 respectively ascertains the actual rotary speed nj. In step S62, the control facility 6 then ascertains the respective setpoint power P1j* by forming the product of the respective setpoint moment Mj* and the respective actual rotary speed nj.

According to FIG. 8, the further steps S63 and S64 can be present. In step S63, the control facility 6 tests whether, for the respective first drive 1a, its actual rotary speed nj is below a minimum rotary speed n0. If this is the case, in the context of ascertaining the respective product—that is, the respective setpoint power P1j*—the control facility 6 replaces the actual rotary speed nj with the minimum rotary speed n0. The minimum rotary speed n0 is itself greater than 0. By this means, it is prevented that the proportional factor fj for the respective first drive 1a becomes 0 If its actual rotary speed nj is at 0.

Alternatively or in addition to steps S63 and S64, steps S65 and S66 can be present. In step S65, the control facility 6 tests whether, for the respective first drive 1a, the respectively ascertained product P1j* lies below a respective minimum product value P0. If this is the case, in the context of ascertaining the proportional factors f, the control facility 6 replaces the ascertained product P1j* with the respective minimum product value P0. The minimum product value P0 is itself greater than 0. By this means, it is also prevented that the proportional factor fj for the respective first drive 1a becomes 0 if its actual rotary speed nj is 0.

The optional embodiments according to steps S63 to S66 can also be implemented with corresponding adaptation as needed in the embodiment according to FIG. 7.

Figure 9:
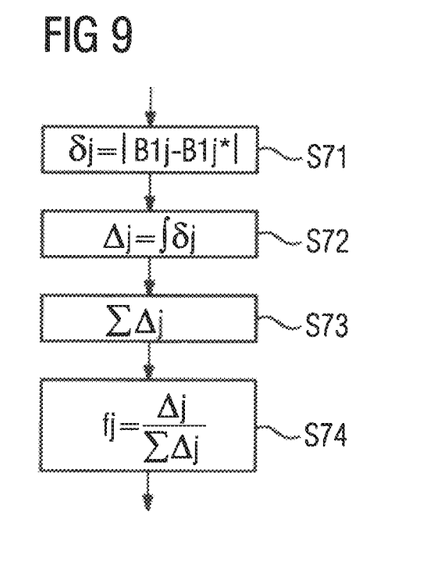

FIG. 9 shows a further possibility for ascertaining the proportional factors f. This embodiment, as such, is not the subject matter of the present invention. In the context of the embodiment of FIG. 9, in step S71, for each of the first drives 1a, the control facility 6 ascertains the difference δj of the respective basic actual value B1j and of the respective basic setpoint value B1j*. Building upon the differences δj, the control facility 6 then ascertains the proportional factors f. For example, in step S72, the control facility 6 can ascertain the integral Δj of the respective difference δj in each case and in step S73, form the sum of the integrals Δj and finally in step S74, ascertain the respective proportional factor fj in that it divides the respective integral Δj by the sum of the integrals Δj. However, other procedures are also possible.

Summarizing, the present invention therefore relates to the following subject matter:

A machine has a plurality of first drives 1a. A control facility 6 of the machine monitors a power demand P1* which the machine draws via a feed facility 2 supplying the first drives 1a with electrical energy. The control facility 6 switches the machine over from a normal operation to a special operation or from a special operation to a normal operation as soon as the power demand P1* exceeds an upper switch-over value GO or falls below a lower switch-over value GU. The control facility 6 ascertains preliminary first current setpoint values I1j* cyclically in both operating modes for the first drives 1a, using first basic setpoint values B1j* of the first drives 1a that are valid for the respective cycle, wherein it ascertains the preliminary first current setpoint values I1j* such that operating states of the first drives 1a are approximated as far as possible to the first basic setpoint values B1j*. It controls the first drives 1a in both operating modes according to resulting first current setpoint values I1j*, I1j*'. In normal operation, the resultant first current setpoint values I1j* match the preliminary first current setpoint values I1j*. In special operation, the control facility 6 then ascertains a total power P1 available for the first drives 1a altogether. In addition, it ascertains for each of the first drives 1a dynamically a respective proportional factor fj while evaluating current setpoint and/or actual operating states of the first drives 1a. Finally, it ascertains the resulting first current setpoint values I1j*' by modification of the preliminary first current setpoint values I1j* such that only a respective power is drawn by each first drive 1a which results as the product of the respective proportional factor fj and the available total power P1. The control facility 6 implements, for the first drives 1a, drive controllers 10 to which the basic setpoint values B1j* and the basic actual values B1j are fed and by means of which the preliminary first current setpoint values I1j* are ascertained. The drive controllers 10 have control characteristics with an integral-action component. The preliminary first current setpoint values I1j* are used in the ascertainment of the proportional factors fj.

The present invention has many advantages. In particular, the full power reserve of the feed facility 2 is distributed to the first drives 1a. By this means, in many cases in which a power limitation is required in the prior art, a power limitation can be avoided. However, if a power limitation is required, this can be limited to the minimum required dimension. To return to the example with 30 kW: in the context of the present invention, for example, 5 kW could be assigned to the first of the three drives mentioned in the example, to the second 7 kW and to the third 18 kW, therefore altogether 30 kW. In each case, the productivity of the machine can be increased. Furthermore, an automatic equalization of the total power P1 available to the first drives 1a is ensured. Both the manufacturer and the operator of the machine can save costs.

Although the invention has been illustrated and described in detail with the preferred exemplary embodiment, the invention is not restricted by the examples disclosed and other variations can be derived therefrom by a person skilled in the art without departing from the protective scope of the invention.

What is claimed is:

1. A method for operating a machine which has a plurality of first drives, said method comprising:
monitoring with a control facility a power demand of the machine from a feed facility supplying at least the first drives with electrical energy;
when the power demand exceeds an upper switch-over value, switching with the control facility the machine over from a normal operation to a special operation, and when the power demand falls below a lower switch-over value, switching the machine over from the special operation to the normal operation;
determining with the control facility cyclically, both in normal operation and also in special operation, for each of the first drives a preliminary first current setpoint value based on a first basic setpoint value of a respective first drive that is valid for the respective cycle;
controlling with the control facility, both in normal operation and also in special operation, the preliminary first current setpoint values such that an operating state of the respective first drive approximates substantially the first basic setpoint value;
controlling with the control facility, both in normal operation and also in special operation, the first drives according to a preliminary first current setpoint value, which in normal operation is identical to the preliminary first current setpoint value;
in special operation, with the control facility
determining a total power available for all first drives, dynamically determining for each of the first drives a respective proportionality factor by evaluating current setpoint operating states and/or actual operating states of the first drives and taking into consideration the preliminary first current setpoint values, and
determining the resulting first current setpoint values by modifying the preliminary first current setpoint values such that each of the respective first drives draws no more than a power level that is the product of the respective proportionality factor and the available total power; and
supplying to a drive controller of the control facility that has a control characteristic with an integral control component, in particular PI controller, for each of the first drives the respective first basic setpoint value and a respective corresponding first basic actual value and determining therefrom with the control facility the respective preliminary first current setpoint value.

2. The method of claim 1, wherein the sum of the proportionality factors is equal to a value 1.

3. The method of claim 1, further comprising:
cyclically determining with the control facility, both in normal operation and also in special operation, for each of a plurality of second drives that are supplied with electrical energy via the feed facility a second current setpoint value, by using a second basic setpoint value of a respective second drive that is valid for a respective cycle, and controlling the respective second drive according to the respective second current setpoint value,
determining with the control facility, both in normal operation and in special operation, the second current setpoint values such that an operating state of the respective second drive substantially approximates the respective second basic setpoint value, and
determining with the control facility the total power available for all of the first drives based on a power limit value of the feed facility and a second power level that is currently drawn by the second drives from the feed facility.

4. The method of claim 3, further comprising operating with the control facility at least one third drive of the machine as a first drive or as a second drive, dependent upon the operating state of the machine.

5. The method of claim 1, wherein the control facility determines the proportionality factors in such a way that the proportionality factor for a respective first drive is equal to a ratio of a setpoint torque to be applied by the respective first drive to a sum of all setpoint torques to be applied by all the first drives.

6. The method of claim 1, wherein the control facility determines the proportionality factors in such a way that the proportionality factor for a respective first drive is equal to a ratio of a product determined for the respective first drive to the sum of all the products determined for all the first drives and wherein the product is determined by a setpoint torque to be applied by the respective first drive and a rotation speed of the respective first drive.

7. The method of claim 6, wherein the rotation speed of the respective first drive is the setpoint rotation speed or the actual rotation speed of the respective first drive.

8. The method of claim 6, further comprising:
when the respective rotation speed of a first drive is less than a minimum rotation speed value that is greater than zero, to determine the product, replacing with the control facility the respective rotation speed with the minimum rotation speed, and/or
when the product determined for a first drive is less than a minimum product value that is greater than zero, replacing with the control facility when determining the proportionality factors, the product with the minimum product value.

9. A control program for a control facility controlling a machine having a plurality of first drives, wherein the control program is embodied in a non-transitory computer-readable medium and comprises machine code which, when loaded into a processor of the control facility and executed by the processor, causes the control facility to operate the machine by
monitoring a power demand of the machine from a feed facility supplying at least the first drives with electrical energy,
when the power demand exceeds an upper switch-over value, switching the machine over from a normal operation to a special operation, and when the power demand falls below a lower switch-over value, switching the machine over from the special operation to the normal operation,
determining cyclically, both in normal operation and also in special operation, for each of the first drives a preliminary first current setpoint value based on a first basic setpoint value of a respective first drive that is valid for the respective cycle,
controlling, both in normal operation and also in special operation, the preliminary first current setpoint values such that an operating state of the respective first drive approximates substantially the first basic setpoint value,
controlling, both in normal operation and also in special operation, the first drives according to a preliminary first current setpoint value, which in normal operation is identical to the preliminary first current setpoint value, in special operation determining a total power available for all first drives, dynamically determining for each of the first drives a respective proportionality factor by evaluating current setpoint operating states and/or actual operating states of the first drives and taking into consideration the preliminary first current setpoint values, and determining the resulting first current setpoint values by modifying the preliminary first current setpoint values such that each of the respective first drives draws no more than a power level that is the product of the respective proportionality factor and the available total power, supplying to a drive controller that has a control characteristic with an integral control component, in particular P1 controller, for each of the first drives the respective first basic setpoint value and a respective corresponding first basic actual value and determining therefrom the respective preliminary first current setpoint value.

10. A control facility for a machine that has a plurality of first drives, wherein the control facility has a microprocessor and is programmed with a control program embodied in a non-transitory computer-readable medium and comprises machine code which, when loaded into the microprocessor and executed by the microprocessor, causes the control facility to operate the machine by monitoring a power demand of the machine from a feed facility supplying at least the first drives with electrical energy, when the power demand exceeds an upper switch-over value, switching the machine over from a normal operation to a special operation, and when the power demand falls below a lower switch-over value, switching the machine over from the special operation to the normal operation, determining cyclically, both in normal operation and also in special operation, for each of the first drives a preliminary first current setpoint value based on a first basic setpoint value of a respective first drive that is valid for the respective cycle, controlling, both in normal operation and also in special operation, the preliminary first current setpoint values such that an operating state of the respective first drive approximates substantially the first basic setpoint value, controlling, both in normal operation and also in special operation, the first drives according to a preliminary first current setpoint value, which in normal operation is identical to the preliminary first current setpoint value, in special operation determining a total power available for all first drives, dynamically determining for each of the first drives a respective proportionality factor by evaluating current setpoint operating states and/or actual operating states of the first drives and taking into consideration the preliminary first current setpoint values, and determining the resulting first current setpoint values by modifying the preliminary first current setpoint values such that each of the respective first drives draws no more than a power level that is the product of the respective proportionality factor and the available total power, supplying to a drive controller that has a control characteristic with an integral control component, in particular P1 controller, for each of the first drives the respective first basic setpoint value and a respective corresponding first basic actual value and determining therefrom the respective preliminary first current setpoint value.

11. A machine, comprising:

a plurality of first drives;

a feed facility supplying at least the first drives with electrical energy; and a control facility which controls the first drives by monitoring a power demand of the machine from a feed facility supplying at least the first drives with electrical energy, when the power demand exceeds an upper switch-over value, switching the machine over from a normal operation to a special operation, and when the power demand falls below a lower switch-over value, switching the machine over from the special operation to the normal operation, determining cyclically, both in normal operation and also in special operation, for each of the first drives a preliminary first current setpoint value based on a first basic setpoint value of a respective first drive that is valid for the respective cycle, controlling, both in normal operation and also in special operation, the preliminary first current setpoint values such that an operating state of the respective first drive approximates substantially the first basic setpoint value, controlling, both in normal operation and also in special operation, the first drives according to a preliminary first current setpoint value, which in normal operation is identical to the preliminary first current setpoint value, in special operation determining a total power available for all first drives, dynamically determining for each of the first drives a respective proportionality factor by evaluating current setpoint operating states and/or actual operating states of the first drives and taking into consideration the preliminary first current setpoint values, and determining the resulting first current setpoint values by modifying the preliminary first current setpoint values such that each of the respective first drives draws no more than a power level that is the product of the respective proportionality factor and the available total power, supplying to a drive controller that has a control characteristic with an integral control component, in particular P1 controller, for each of the first drives the respective first basic setpoint value and a respective corresponding first basic actual value and determining therefrom the respective preliminary first current setpoint value.

* * * * *